(12) United States Patent
Ravan

(10) Patent No.: US 7,454,579 B1
(45) Date of Patent: Nov. 18, 2008

(54) MANAGING ACCESS TO SHARED RESOURCES

(75) Inventor: Daniel Ravan, Fremont, CA (US)

(73) Assignee: EMC Corporation, Hopkinton, MA (US)

( * ) Notice: Subject to any disclaimer, the term of this patent is extended or adjusted under 35 U.S.C. 154(b) by 191 days.

(21) Appl. No.: 11/305,308

(22) Filed: Dec. 15, 2005

(51) Int. Cl.
*G06F 12/00* (2006.01)

(52) U.S. Cl. ............... 711/151; 711/150; 711/169; 710/200; 718/103; 718/104; 718/105; 718/106; 718/107

(58) Field of Classification Search .......... 711/150–151
See application file for complete search history.

(56) References Cited

U.S. PATENT DOCUMENTS

| 6,553,869 B1 * | 4/2003 | MacKelvie | 76/112 |
| 2002/0083063 A1 * | 6/2002 | Egolf | 707/100 |

* cited by examiner

*Primary Examiner*—Matt Kim
*Assistant Examiner*—Hetul Patel
(74) *Attorney, Agent, or Firm*—Van Pelt, Yi & James LLP (57) ABSTRACT

Managing access to a shared resource includes receiving a request indicating that an operation requires access to the shared resource, associating the operation with a lock in a lock queue that is associated with the shared resource, and determining whether the shared resource is accessible to the operation.

40 Claims, 8 Drawing Sheets

MANAGING ACCESS TO SHARED RESOURCES

BACKGROUND OF THE INVENTION

Systems with shared resources often require resource allocation and control. Current resource management schemes typically allocate sufficient resources for each operation and maintain locks on the allocated resources for the duration of the operation.

Consider a simple example in which a data backup system involves one operation for labeling a number of storage elements (such as optical disks) and another operation for copying a second set of storage elements. The operations are invoked at approximately the same time. Each operation requires exclusive access to devices for manipulating the storage elements (such as an optical disk drive) while the operation executes. Given that there are a limited number of devices available to these operations in the system, a resource allocation scheme that grants an operation exclusive access to a fixed number of devices may result in resource starvation or reduced performance. For example, if all the devices are allocated to the first operation initially, the execution of the second operation will be starved or blocked until the first operation completes and frees the devices. If half of the devices are allocated to each of the operations, once the faster operation completes and releases its devices, the freed devices will remain idle and lead to inefficient utilization of resources. As systems grow more complex, so does the problem of efficiently managing shared resources.

It would be desirable to have a way to manage shared resources that would avoid resource starvation. It would also be useful if the resource management scheme could be more efficient.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Managing access to one or more shared resources is described. In some embodiments, a lock queue associated with a shared resource is used to manage access to the resource. Operations are associated with locks in the lock queue. In some embodiments, whether the shared resource is accessible to a particular operation depends at least in part on whether the operation is the next one in line in the lock queue. In some systems, there are multiple categories of shared resources. An operation may be required to gain access to all the required resources in one category before it can obtain access to another category of resources. Lock queues are used to manage the operation's access to a specific category of resources in some embodiments.

Figure 1:
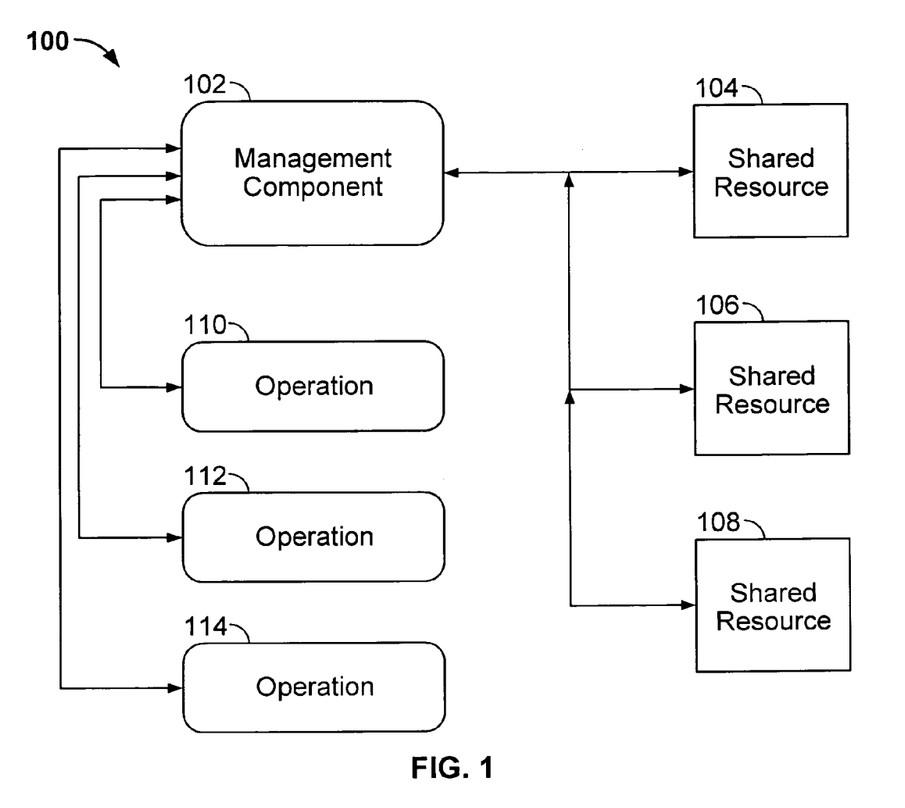
FIG. 1 is a block diagram illustrating a system embodiment with shared resources.

FIG. 1 is a block diagram illustrating an embodiment of a system with shared resources. In various embodiments, system 100 comprises a network server, a data storage-backup server, a general purpose computer system, or any other appropriate entity. In this example, system 100 is shown to include a management component 102 for controlling access to resources 104-108. Each of the resources can be accessed and used by any of the operations 110-114. Thus, the resources are referred to as shared resources. As will be shown in more detail below, some system embodiments include more than one category of shared resources. The total number of shared resources, categories of shared resources, and operations in the system may differ in different embodiments. The management component and the operations may be implemented as a single process or separately depending on system requirements.

In the example shown, each resource, although accessible by various different operations at different times, is accessed atomically by one operation at a time. As used herein, atomic access means that the access to a resource is exclusive until the resource is released. In other words, only one operation may obtain access to a shared resource and use it at one time. After the operation frees the shared resource, another operation can obtain access to the same resource. As will be shown in more detail below, operations 110-114 gain access to a shared resource by interacting with the management component.

Figure 2:
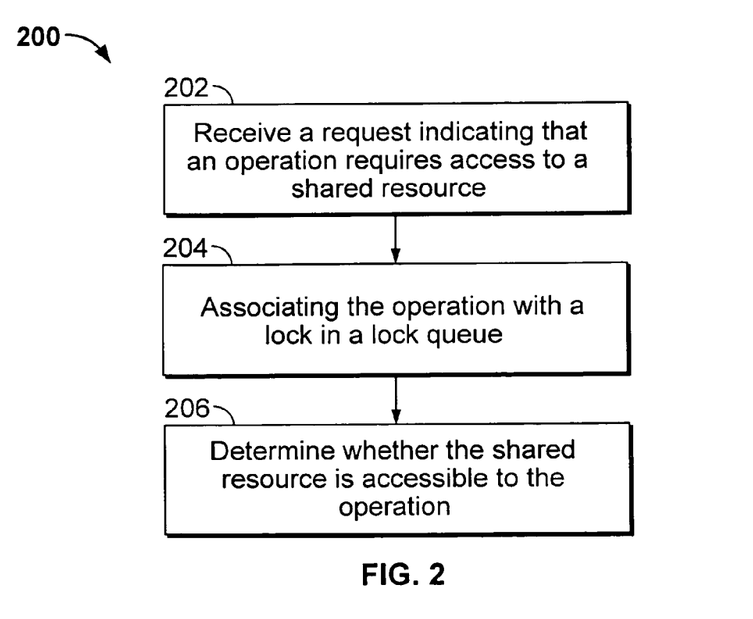
FIG. 2 is a flowchart illustrating a process for managing a shared resource according to some embodiments.

Lock queues are used in some embodiments for managing shared resources. FIG. 2 is a flowchart illustrating an embodiment of a process for managing a shared resource. Process 200 may be implemented on, for example, the management component. In this example, process 200 initiates when a request indicating that an operation requires access to a shared resource is received (202). The request may be implemented as a signal, a message, a function call, a pointer to a function call, or any other appropriate manner. The operation is then associated with a lock in a lock queue of the shared resource (204). In some embodiments, the operation is associated with the lock using a pointer, a reference identifier, or the like.

It is determined whether the shared resource is accessible to the operation (204). The resource is deemed accessible to the operation if it is not used by any other operation. In some embodiments, multiple operations can make requests for the same shared resource and the position of a lock associated with a particular operation in the lock queue depends on the order in which the operation is received. Thus, whether the operation can start executing is determined based at least in part on whether the operation is the next one in the lock queue to access the resource. The determination can be made by, for example, examining the lock queue for other locks ahead of the one associated with the operation, examining the queue position of the lock associated with the operation, examining a data structure used for tracking resource usage, or any other appropriate means.

Figure 3:
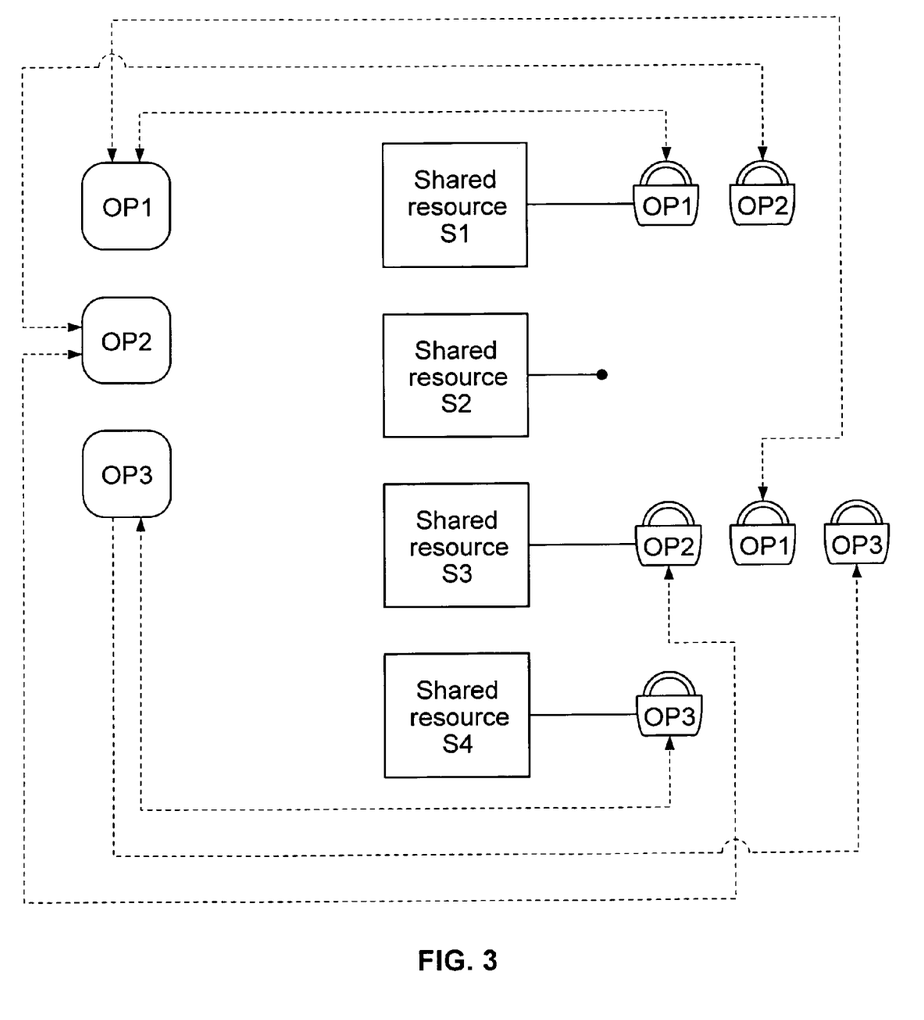
FIG. 3 is a block diagram illustrating an example implementation of resources managed using lock queues.

FIG. 3 is a block diagram illustrating an example implementation of resources managed using lock queues. In this example, three operations OP1-OP3 share resources S1-S4. Each of shared resources is associated with a lock queue. The lock queues may be implemented as linked lists or any other appropriate structures. Each operation places locks in the lock queues of the operation's required resources. Within each lock queue, the locks are placed according to the order of the requests from the operations. For example, operation OP1 makes requests and places locks in required resources S1 and S3. Operation OP2 also makes requests and places locks in S1 and S3. The locks associated with OP2 are placed behind the locks associated with OP1 in the lock queues. If operation OP3 makes a request for resources S3 and S4, the system will determine if the resources are available to the operation. In this case, there are other locks in the lock queue of S3 (namely, locks associated with OP1 and OP2), indicating that the resource is not yet available to OP3. A lock associated with OP3 is then added to the queue. This lock secures a place in the queue for OP3, and ensures that the operation will gain access to resource S3 once the resource is released by the previous operations. As shown, OP1 has a lock at the head of the queue and is allowed atomic access to resource S3 first. After OP1 finishes using resource S3, it releases the lock and resource S3 becomes available to OP2. After OP2 finishes using resource S3 and releases its lock, OP3 can then access resource S3.

In contrast, resource S4 currently does not have any other lock in its queue. Thus, resource S4 is accessible to OP3 immediately. A lock associated with OP3 is added to resource S4's lock queue to prevent other resources from accessing resource S4 during OP3's execution. Once the operation completes, the lock is released. If applicable, the next operation in queue is given access to the resource and allowed to commence. OP3 may start operating on a resource as soon as it gains access to it, or wait until it gains access to other resources. In some embodiments, a timeout is used to ensure that an operation does not block other operations from using a shared resource while the blocking operation waits for other resources required to perform the blocking operation to become available. If an operation holding a lock on a shared resource is unable to begin execution prior to a timeout period, the lock is relinquished and the operation must try again, e.g., by taking a new place at the end of the lock queue for the shared resource.

In some embodiments, an operation is differentiated into one or more component tasks (also referred to as tasks) and for each component task a lock is placed in a lock queue associated with a shared resource required and/or able to be used to perform the task. In some embodiments, processing an operation as a set of one or more component tasks enables tasks for which required shared resources are available to be completed while the operation waits for other shared resources required to perform other tasks to become available. In some embodiments, processing an operation as a set of one or more component tasks facilitates optimal use of shared resources by allowing each operation to begin execution once a minimum number of shared resources become available to the operation and compete with other operations for additional shared resources, up to a maximum number in some embodiments, until the operation is completed, so that additional shared resources are used by an operation, thereby improving performance, if such additional resources are and/or become available while the operation is executing.

Figure 4:
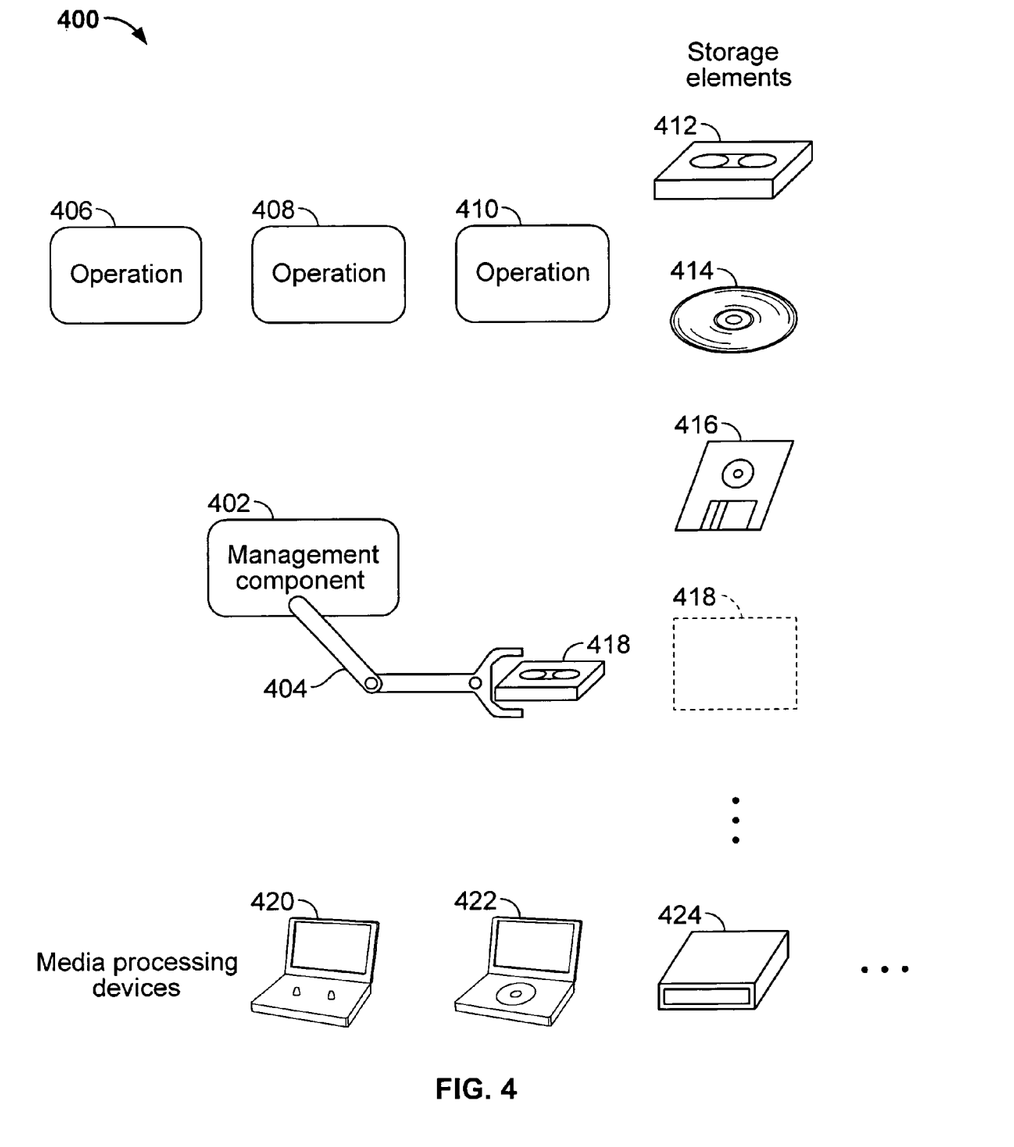
FIG. 4 is a block diagram illustrating a storage system embodiment with multiple categories of shared resources.

In some embodiments, different categories of shared resources are managed differently. FIG. 4 is a block diagram illustrating a storage system embodiment with multiple categories of shared resources. In this example, system 400 includes two categories of shared resources: a first category including storage elements 412-418 and the second category including media processing devices 420-424. Examples of storage elements include magnetic tapes, optical disks, or any type of removable media as well as any other appropriate storage media. Examples of media processing devices include tape drives, optical drives, or any type of device for reading from and/or writing to removable media and/or other storage elements. Based on the commands of operations 406-410, a robotic arm 404 transfers the storage elements from their stored locations, e.g., slots in a media library, to the devices to perform the appropriate operations. An operation may include one or more tasks such as labeling, taking inventory, making backup, erasing, etc. The operations cooperate with management component 402 to gain access to the storage elements and the devices. Details of the resource management are shown below. In the example shown, the management component also controls the actions of the robotic arm, although in some embodiments the control function may be implemented separately.

Figure 5:
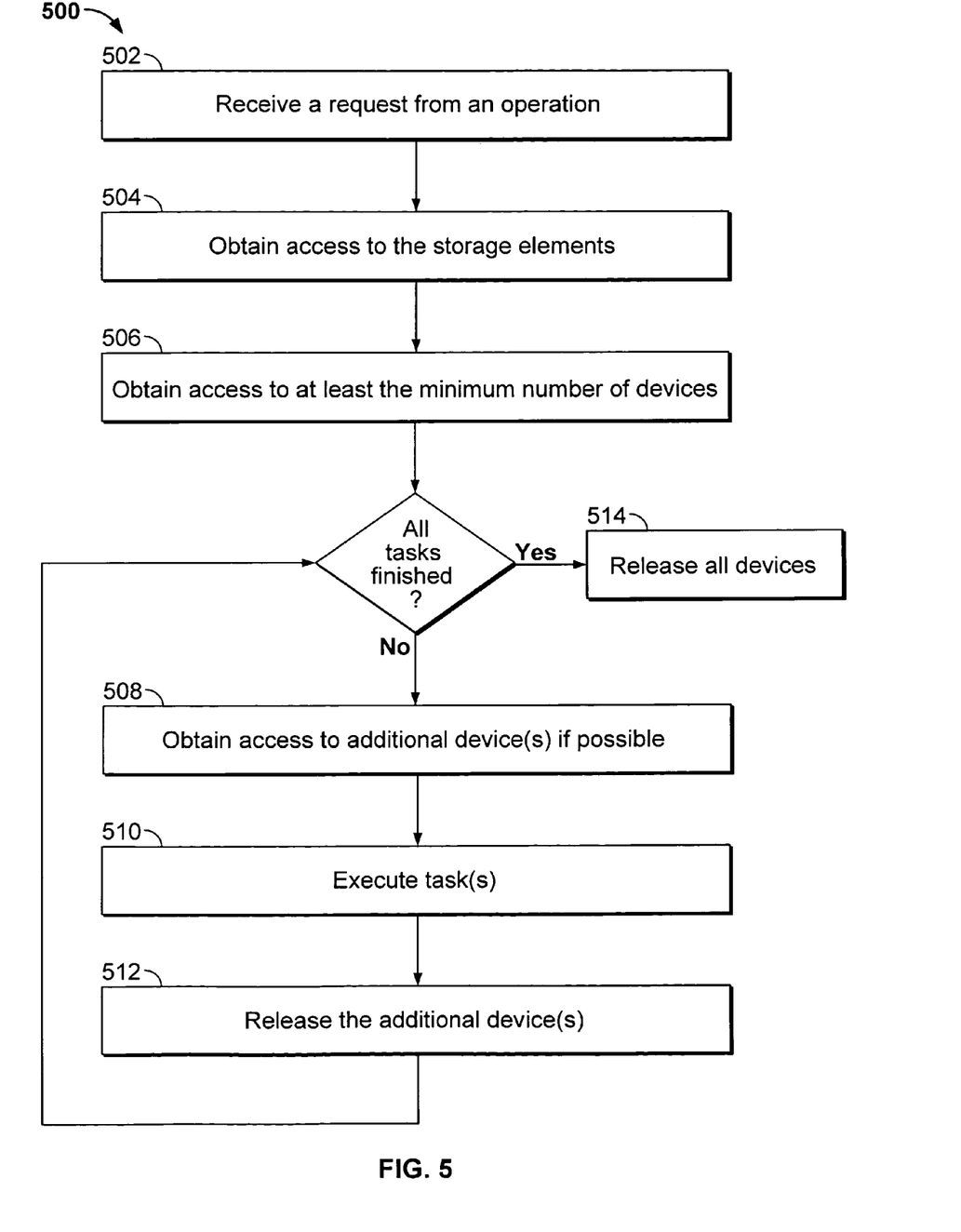
FIG. 5 is a flowchart illustrating a resource management process according to system embodiment 400 of FIG. 4.

FIG. 5 is a flowchart illustrating an embodiment of a resource management process. In some embodiments, the process of FIG. 5 is implemented on the management component 402 of FIG. 4. In this example, each operation requires access to certain storage elements. Once access to the require storage elements is obtained, the operation requires a minimum number of devices for processing the storage elements. The process begins when a resource request is received from an operation (502). Access to all the storage elements required by the operation is obtained (504). In some embodiments, access to storage elements is carried out using a process similar to 200. In some embodiments, the process is repeated until all required storage elements are obtained. In some embodiments, the process is performed in parallel to obtain various storage elements. In some embodiments, to avoid dead locks, an operation must acquire the required storage elements within an allotted amount of time else the operation times out, releases any storage elements it already has acquired, and retries to acquire the required storage elements again.

In some embodiments, an operation is decomposed into one or more tasks each requiring atomic access to a device. For example, a backup operation to be performed using a new and/or otherwise not yet labeled storage element, e.g., a new volume of media, in some embodiments is decomposed into a first task to label the media and a second task to write to the labeled media the data to be backed up. To perform a labeling task, a storage element is placed in a device and the device is used to write label data in a prescribed manner and/or location on the storage element. To perform a writing task, the storage element is placed in a device and data to be backed up is copied from a primary storage location and written, using the device, to the storage element. Another example is an operation to label multiple volumes of media, which in some embodiments is decomposed into a separate labeling task for each volume. In some embodiments, for each operation, there are a minimum number of devices required and a maximum number of devices allowed. The values of the minima and maxima associated with an operation may be determined manually by a user of the system, programmatically according to a criterion or algorithm, or any other appropriate means. In some embodiments, default numbers are assigned (e.g., a minimum value of 1 and a maximum value equal to the total number of devices in the system). In process 500, after access to the storage elements is obtained, access to the minimum number of devices required is obtained (506). A lock is used to gain exclusive access to each of the obtained devices and ensure atomic access. The lock may be implemented using a mutex or any other appropriate data structure.

In this example, the operation is broken down into one or more tasks that require access to the device(s). For each operation, additional devices beyond the minimum number, if available, may also be obtained, e.g., to perform tasks comprising the operation that have not yet been performed, up to the maximum number (508). In some embodiments, tasks associated with different operations simultaneously in progress will compete to obtain additional devices. In some embodiments, the tasks/operations are given priority levels and the tasks with higher priority are more likely to gain additional devices. In some embodiments, operations compete for additional resource—e.g., beyond the required minimum and up to the permitted maximum—by placing, or having placed on their behalf, in one or more respective lock queues associated with one or more additional shared resources, lock requests associated with the operation and/or one or more of its component tasks. The tasks execute using with the devices the operation has obtained (510) and any device in excess of the minimum is released after a task completes (512). If it has additional tasks to complete, an operation that releases a device (i.e., one beyond its minimum number) after completing a task competes with any other operation(s) vying to use the additional resource for the right to use the released resource for a subsequent component task. Thus, an operation maintains exclusive and successive use of its associated minimum number of devices to perform successive tasks comprising the operation and competes with other operations, if any, for additional devices up to an associated maximum. Obtaining additional devices, executing tasks and releasing excess devices are repeated until all tasks comprising the operation are complete. All devices occupied by the operation are released once all tasks comprising the operation have been completed (514).

FIGS. 6A-6D are diagrams illustrating system data structures according to an example process. In this example, three operations (OP1, OP2, and OP3) are configured to run in a system with two categories of shared resources, where one category includes a greater number of shared resources than the other. The first category includes eight storage elements (S1-S8) and the second category includes four devices (D1-D4). OP1 is configured to label storage elements S1-S3, OP2 is configured to take inventory of storage elements S3-S5, and OP3 is configured to use storage elements S6-S8 to backup data. Accordingly, each operation is decomposed into multiple discrete tasks of labeling, taking inventory of, or performing a backup using a single storage element. Each operation requires a minimum of one device and is allowed to use a maximum of three devices. The sequence of events shown in the following example is for purposes of illustration only and may vary in different embodiments.

Figure 6A:
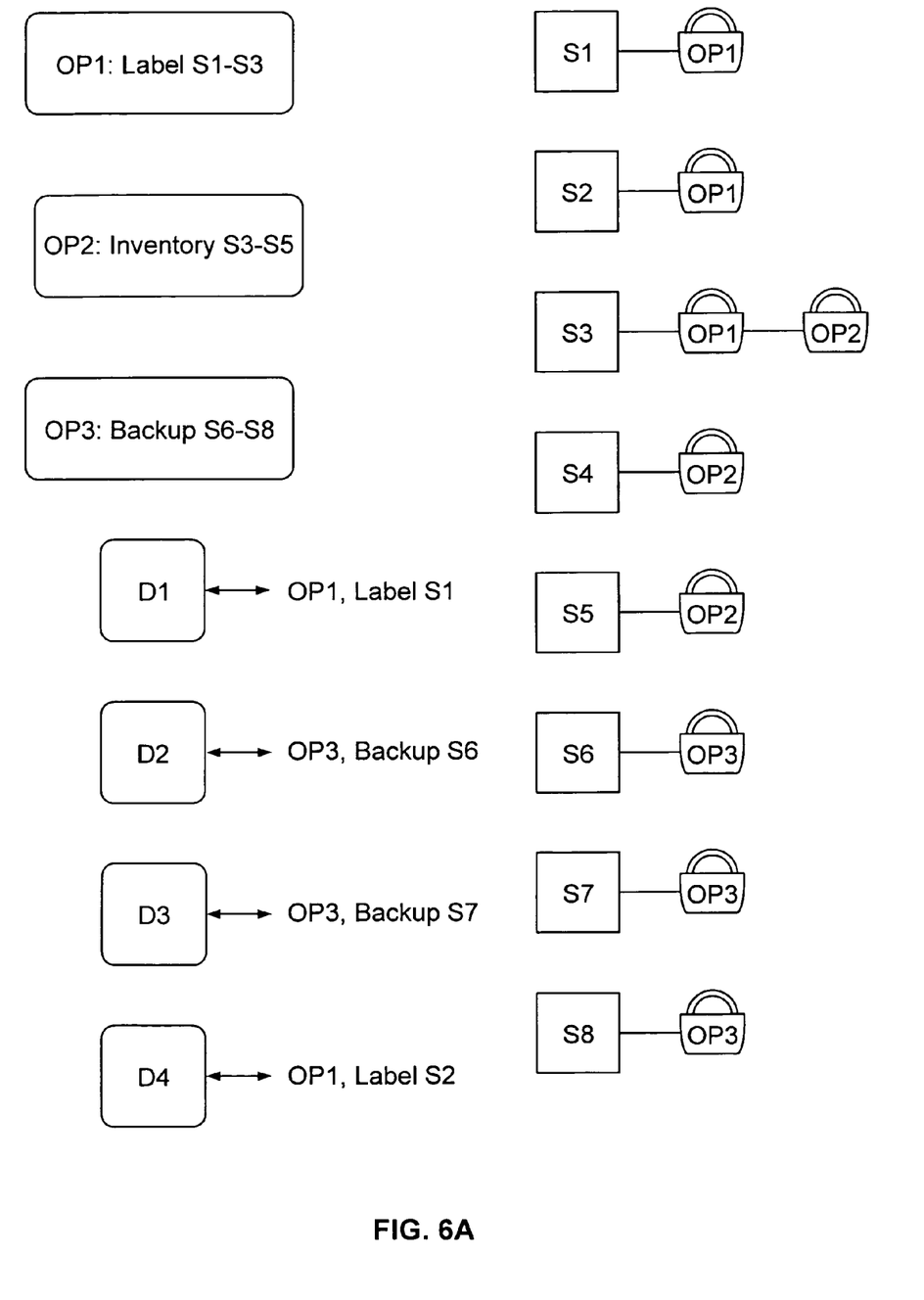
FIGS. 6A-6D are diagrams illustrating system data structures according to an example process.

FIG. 6A illustrates the data structures in the system when the operations commence. The operations start nearly simultaneously, in the order OP1, OP2, OP3, and each operation attempts to gain access to the storage elements it requires. Access is obtained by placing a lock in the lock queue of each storage element. Both OP1 and OP2 require S3. OP1 placed its lock in S3's lock queue before OP2, therefore OP1 has priority in using S3 over OP2. OP1 and OP3 both have acquired all the required storage elements and can begin performing their tasks. OP2, on the other hand, has only acquired storage elements S4 and S5 and needs to wait until S3's lock associated with OP1 is released to gain access to S3.

OP1 and OP3 start their respective tasks by each gaining atomic access to one device. In the example shown, OP1 has gained access to D1 and OP3 has gained access to D2. OP1 will use D1 for labeling S1 and OP3 will use D2 for performing a backup using S6. In this example, OP1 and OP3 have equal priority and compete for the remaining devices D3 and D4. The result of this competition in this example is that OP 1 has gained access to D4, which is used for labeling S2, and OP3 has gained access to D3, which is used for backing up S7. By letting OP1 and OP3 compete on an equal footing for additional devices, a fair allocation and maximum utilization are achieved.

Figure 6B:
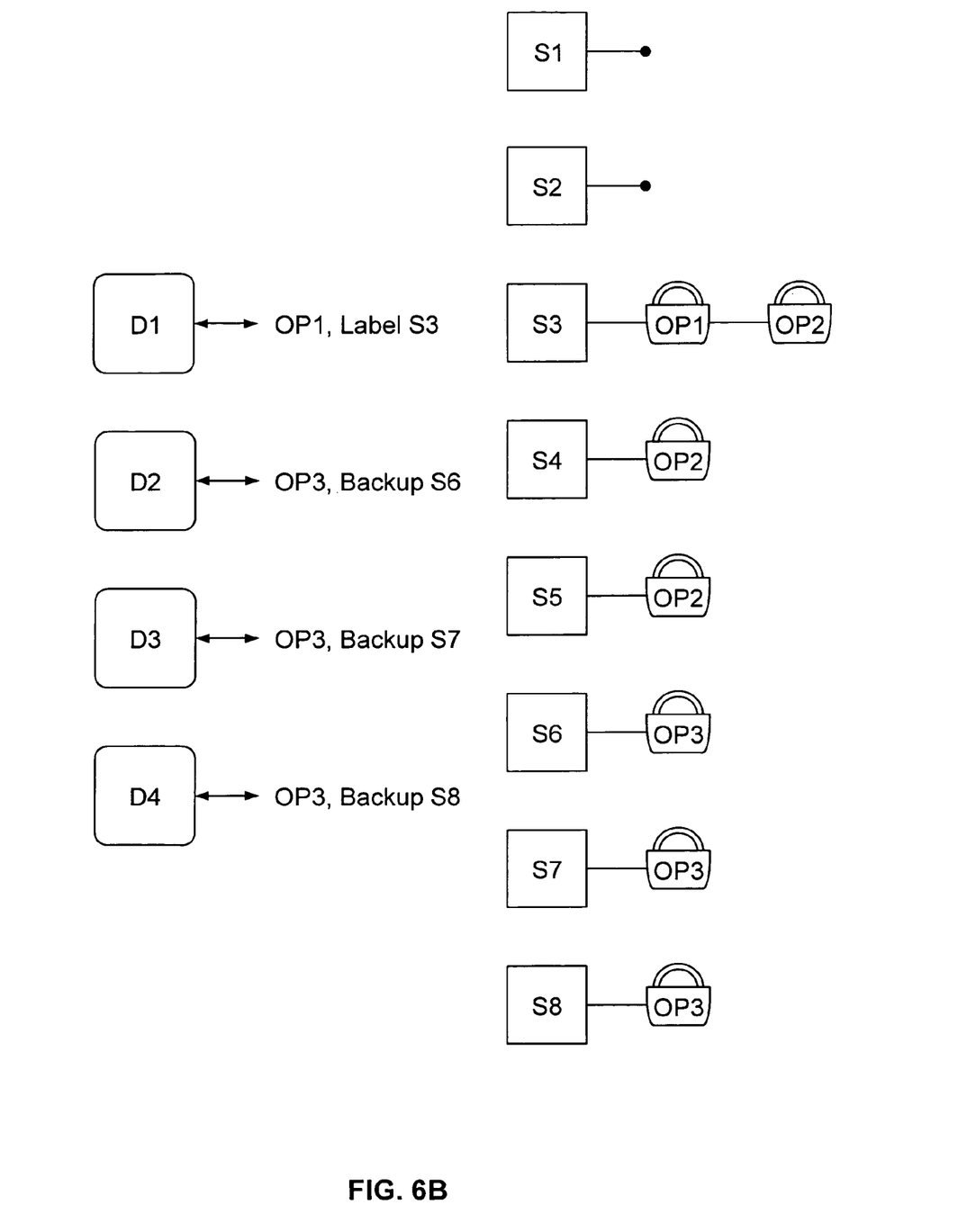

FIG. 6B illustrates the data structures after OP1 is finished using D1 and D4 to label S1 and S2, respectively. In the example shown, the labeling tasks of OP1 are finished prior to any of the backup tasks performed by OP3. Once a task completes, the operation releases the device used for the task unless the operation has additional tasks to complete and releasing the device would leave the operation with access to fewer than an associated minimum number of device(s). A released device is returned into a pool of free devices so that the operations may compete for access. In this case, once the labeling task of S2 is finished, D4 is released. In the example shown, the release of D4 would result in OP1 and OP3 competing for use of D4, since both OP1 and OP3 have remaining tasks to complete and OP2 has not yet gained access to the storage elements required to begin execution of OP2. In this example, OP3 gains access to D4 and uses D4 for backing up S8. When the labeling task of S1 completes, however, D1 is retained (to maintain a minimum of one device available for use by OP1) and used to label S3. The locks for S1 and S2 are released from their respective lock queue.

Figure 6C:
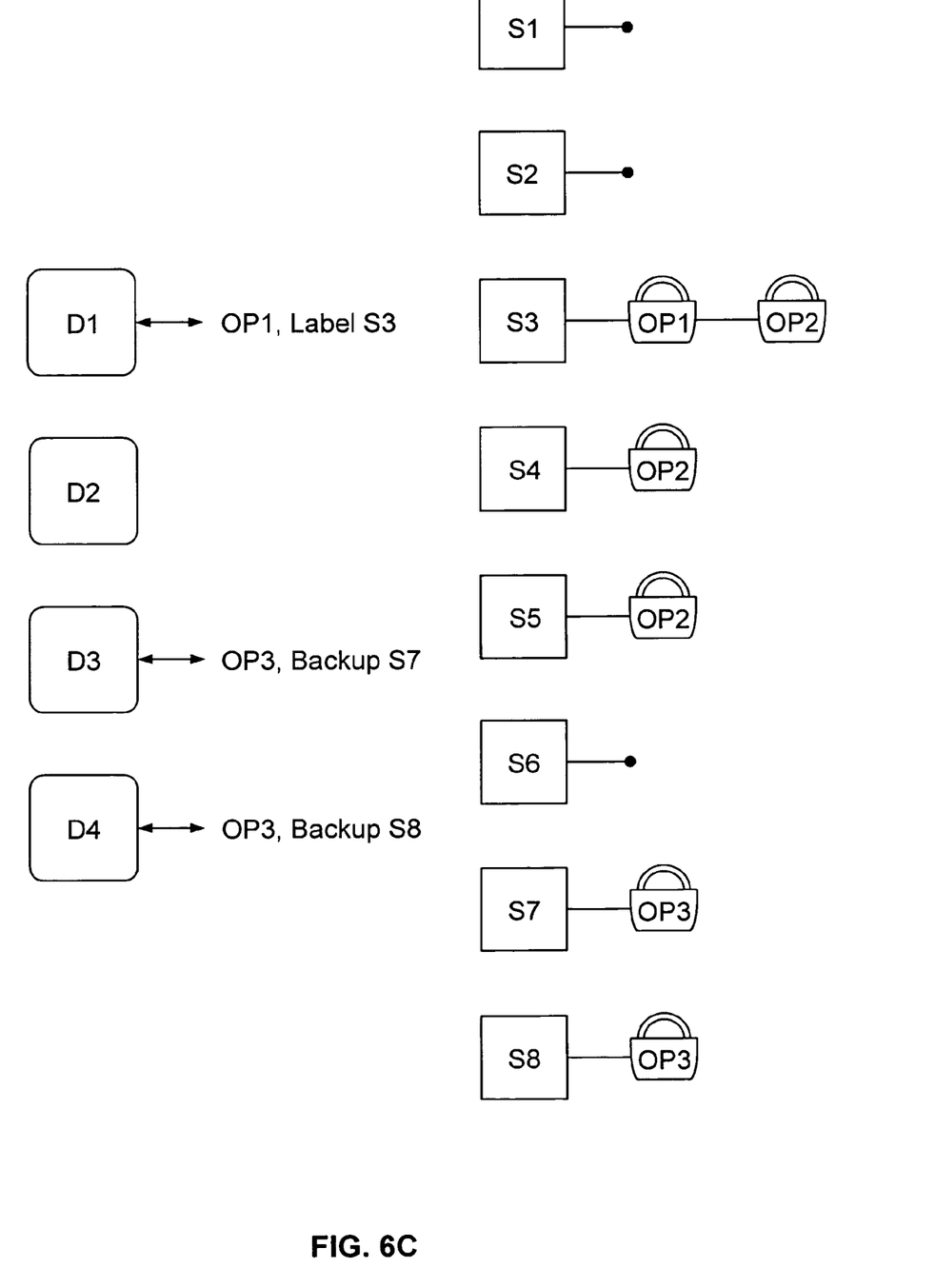

In FIG. 6C, OP3 has finished backing up S6 and releases D2 into the free device pool. Neither OP1 nor OP3 has any remaining task that has not started. OP2, however, is not yet ready to take advantage of the free device because its access to S3 is still blocked.

Figure 6D:
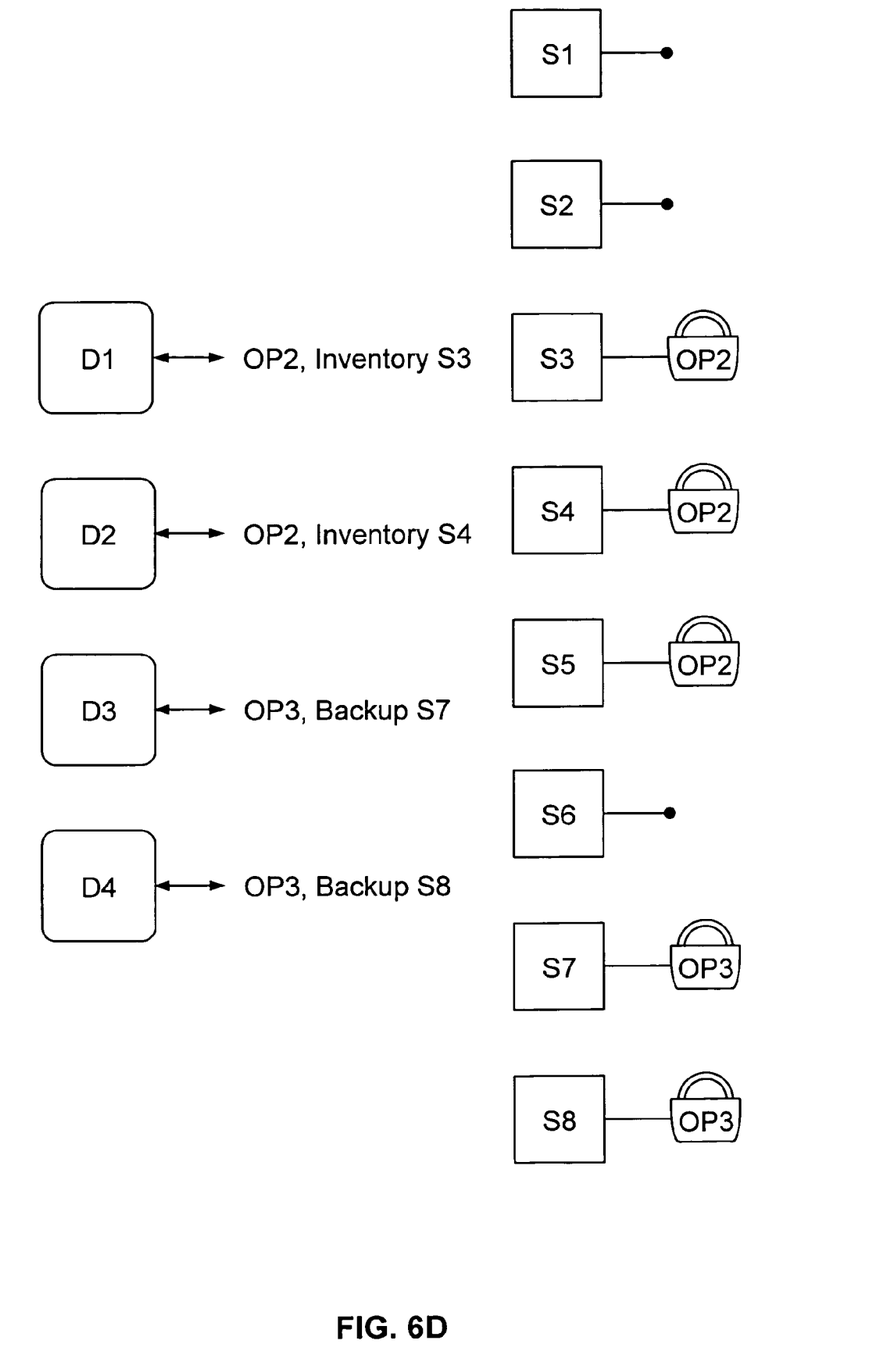

In FIG. 6D, OP1 has finished labeling S3 and removed its lock from S3's lock queue. OP2 gains access to all the required storage elements S3-S5. OP2 now occupies devices D1 and D2 to run the tasks of taking inventory of S3 and S4. OP2 will also opportunistically gain access to whichever device that becomes available next to perform the task for taking inventory of S5.

Managing access to shared resources has been disclosed. Although data backup systems are discussed extensively for purposes of illustration, the technique is also applicable to other systems including networking systems, printing systems, or any other general purpose or multipurpose systems. The technique described provides, among other things, efficient resource management and less chance of resource starvation. Although data storage systems are discussed for purposes of example, the technique described is applicable to other systems having shared resources as well.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of managing access to shared resources, comprising:
    receiving a request indicating that an operation requires access to a specific shared resource of a first category and a minimum number of shared resources of a second category, the minimum number being at least one, wherein the operation is decomposed into a plurality of tasks;
    associating the operation with a lock in a lock queue that is associated with the specific shared resource of the first category;
    determining whether the specific shared resource of the first category is accessible to the operation; and
    determining whether the operation is ready to be executed, the determination being based at least in part on whether the minimum number of shared resources of the second category are accessible to the operation;
    in the event that the specific shared resource of the first category is available, gaining access to the minimum number of shared resources of the second category;
    beginning to execute at least one of the plurality of tasks once the minimum number of shared resources of the second category become available to the operation; and
    competing for additional shared resources of the second category beyond the minimum number and up to a maximum allowed number to be used by successive tasks.

2. A method as recited in claim 1, wherein determining whether the operation can be executed is further based at least in part on whether the lock associated with the operation is the next one in the lock queue.

3. A method as recited in claim 1, wherein the access to the specific shared resource of the first category is atomic.

4. A method as recited in claim 1, wherein the first category of shared resources includes a storage element.

5. A method as recited in claim 1, wherein the access to each of the minimum number of shared resources of the second category is atomic.

6. A method as recited in claim 1, wherein:
    the operation includes at least one task that requires access to the minimum number of shared resources of the second category; and
    determining whether the operation is ready to be executed is based at least in part on the minimum number of shared resources of the second category being accessible to the task.

7. A method as recited in claim 6, in the event that the minimum number of shared resources of the second category are accessible to the task, further comprising acquiring access to the minimum number of shared resources of the second category and executing the task.

8. A method as recited in claim 1, wherein the second category of shared resources includes a media processing device.

9. A method as recited in claim 1, wherein the first category includes a greater number of shared resources than the second category.

10. A method as recited in claim 1, wherein the operation has a priority level that determines its priority in accessing the minimum number of shared resources of the second category.

11. A method as recited in claim 1, further comprising executing successive tasks; and maintaining exclusive use of at least the minimum number of shared resources of the second category.

12. A method as recited in claim 1, further comprising determining whether the total number of shared resources of the second category is greater than the minimum number; and in the event that the total number of shared resources of the second category is greater than the minimum, releasing at least one of the minimum number of shared resources of the second category upon completion of a task.

13. A method as recited in claim 12, in the event that there is a remaining task to be executed, further comprising competing with other operations for an additional shared resource of the second category.

14. A system for managing access to shared resources, comprising:
    a processor configured to:
        receive a request indicating that an operation requires access a specific shared resource of a first category and a minimum number of shared resource of a second category, the minimum number being at least one, wherein the operation is decomposed into a plurality of tasks;
        associate the operation with a lock in a lock queue that is associated with the specific shared resource of the first category; and
        determine whether the specific shared resource of the first category is accessible to the operation; and
        determine whether the operation is ready to be executed, the determination being based at least in part on whether the minimum number of shared resources of the second category are accessible to the operation;
        in the event that the specific shared resource of the first category is available, gain access to the minimum number of shared resources of the second category;
        begin to execute at least one of the plurality of tasks once the minimum number of shared resources of the second category become available to the operation; and
        compete for additional shared resources of the second category beyond the minimum number and up to a maximum allowed number to be used by successive tasks; and
    a memory coupled to the processor, configured to provide the processor with instructions.

15. A system as recited in claim 14, wherein determining whether the operation can be executed is further based at least in part on whether the lock associated with the operation is the next one in the lock queue.

16. A system as recited in claim 14, wherein the access to the specific shared resource of the first category is atomic.

17. A system as recited in claim 14, wherein the first category of shared resources includes a storage element.

18. A system as recited in claim 14, wherein the access to each of the minimum number of shared resources of the second category is atomic.

19. A system as recited in claim 14, wherein the first category of shared resources includes a storage element.

20. A system as recited in claim 14, wherein:
    the operation includes at least one task that requires access to the minimum number of shared resources of the second category; and determining whether the operation is ready to be executed is based at least in part on the minimum number of shared resources of the second category being accessible to the task.

21. A system as recited in claim 20, wherein in the event that the minimum number of shared resources of the second category are accessible to the task, the processor is further configured to access to the minimum number of shared resources of the second category and executing the task.

22. A system as recited in claim 14, wherein the second category of shared resources includes a media processing device.

23. A system as recited in claim 22, in the event that there is a remaining task to be executed, the processor is further configured to compete with other operations for an additional shared resource of the second category.

24. A system as recited in claim 14, wherein the first category includes a greater number of shared resources than the second category.

25. A system as recited in claim 14, wherein the operation has a priority level that determines its priority in accessing the minimum number of shared resources of the second category.

26. A system as recited in claim 14, wherein the processor is further configured to execute successive tasks and maintain exclusive use of at least the minimum number of shared resources of the second category.

27. A system as recited in claim 14, wherein the processor is further configured to:
    determine whether the total number of shared resources of the second category is greater than the minimum number; and
    in the event that the total number of shared resources of the second category is greater than the minimum, release at least one of the minimum number of shared resources of the second category upon completion of a task.

28. A computer program product for managing access to shared resources, the computer program product being embodied in a computer readable storage medium and comprising computer instructions for:
    receiving a request indicating that an operation requires access to a specific shared resource of a first category and a minimum number of shared resources of a second category, the minimum number being at least one, wherein the operation is decomposed into a plurality of tasks;
    associating the operation with a lock in a lock queue that is associated with the specific shared resource of the first category;
    determining whether the specific shared resource of the first category is accessible to the operation; and
    determining whether the operation is ready to be executed, the determination being based at least in part on whether the minimum number of shared resources of the second category are accessible to the operation;
    in the event that the specific shared resource of the first category is available, gaining access to the minimum number of shared resources of the second category;
    beginning to execute at least one of the plurality of tasks once the minimum number of shared resources of the second category become available to the operation; and
    competing for additional shared resources of the second category beyond the minimum number and up to a maximum allowed number to be used by successive tasks.

29. A computer program product as recited in claim 28, wherein determining whether the operation can be executed is further based at least in part on whether the lock associated with the operation is the next one in the lock queue.

30. A computer program product as recited in claim 28, wherein the access to the specific shared resource of the first category is atomic.

31. A computer program product as recited in claim 28, wherein the first category of shared resources includes a storage element.

32. A computer program product as recited in claim 28, wherein the access to each of the minimum number of shared resources of the second category is atomic.

33. A computer program product as recited in claim 28, wherein:
    the operation includes at least one task that requires access to the minimum number of shared resources of the second category; and
    determining whether the operation is ready to be executed is based at least in part on the minimum number of shared resources of the second category being accessible to the task.

34. A computer program product as recited in claim 33, in the event that the minimum number of shared resources of the second category are accessible to the task, further comprising instructions for acquiring access to the minimum number of shared resources of the second category and executing the task.

35. A computer program product as recited in claim 28, wherein the second category of shared resources includes a media processing device.

36. A computer program product as recited in claim 28, wherein the first category includes a greater number of shared resources than the second category.

37. A computer program product as recited in claim 28, wherein the operation has a priority level that determines its priority in accessing the minimum number of shared resources of the second category.

38. A computer program product as recited in claim 28, further comprising executing successive tasks; and maintaining exclusive use of at least the minimum number of shared resources of the second category.

39. A computer program product as recited in claim 28, further comprising instructions for determining whether the total number of shared resources of the second category is greater than the minimum number; and in the event that the total number of shared resources of the second category is greater than the minimum, releasing at least one of the minimum number of shared resources of the second category upon completion of a task.

40. A computer program product as recited in claim 39, in the event that there is a remaining task to be executed, further comprising instructions for competing with other operations for an additional shared resource of the second category.

* * * * *